(12) United States Patent
Nishimura

(10) Patent No.: US 9,392,130 B2
(45) Date of Patent: Jul. 12, 2016

(54) IMAGE FORMING APPARATUS HAVING A MOUNTABLE OPTION DEVICE

(71) Applicant: KYOCERA Document Solutions Inc., Osaka (JP)

(72) Inventor: Jun Nishimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 13 days.

(21) Appl. No.: 14/662,878

(22) Filed: Mar. 19, 2015

(65) Prior Publication Data

US 2015/0281469 A1  Oct. 1, 2015

(30) Foreign Application Priority Data

Mar. 26, 2014 (JP) ................. 2014-063149

(51) Int. Cl.
*G06F 3/12* (2006.01)
*H04N 1/00* (2006.01)
*G06K 15/00* (2006.01)
*B41L 43/00* (2006.01)
*B41F 13/58* (2006.01)
*B42C 1/00* (2006.01)

(52) U.S. Cl.
CPC .......... *H04N 1/0032* (2013.01); *H04N 1/0097* (2013.01); *H04N 1/00649* (2013.01); *H04N 1/00663* (2013.01); *H04N 1/00931* (2013.01); *H04N 2201/0094* (2013.01)

(58) Field of Classification Search
CPC combination set(s) only.
See application file for complete search history.

(56) References Cited

U.S. PATENT DOCUMENTS

2006/0238793 A1\* 10/2006 Akashi ................. G06F 3/1204
  358/1.13
2012/0245012 A1\* 9/2012 Nozawa ................. B65H 31/02
  493/405

FOREIGN PATENT DOCUMENTS

JP  8-69141 A  3/1996

\* cited by examiner

*Primary Examiner* — Barbara Reiner
*Assistant Examiner* — Henok A Shiferaw
(74) *Attorney, Agent, or Firm* — Stein IP, LLC

(57) ABSTRACT

An image forming apparatus includes: a main body storage portion that stores control information which defines a control condition of an option device; and a main body control portion that makes a printing portion perform operation in accordance with the control condition of the option device, and based on the control condition of the option device, gives an operation instruction to an option control portion, wherein in a case where an unsuitableness error, the option control portion transmits the control information stored in the option storage portion to the main body control portion, and the main body control portion updates the control information such that the control information stored in the main body storage portion becomes the control information suitable for specifications of the option device.

11 Claims, 4 Drawing Sheets

IMAGE FORMING APPARATUS HAVING A MOUNTABLE OPTION DEVICE

INCORPORATION BY REFERENCE

The present application is based on and claims the benefit of priority from Japanese Patent Application No. 2014-063149 filed on Mar. 26, 20149, the contents of which are hereby incorporated by reference.

BACKGROUND

The present disclosure relates to an image forming apparatus on which an option device can be mounted.

There are some image forming apparatuses on which an option device can be mounted. For example, there is a case where a post-process device for applying a post-process (punch process or staple process) to a printed sheet is mounted as an option device on an image forming apparatus. An apparatus main body of such an image forming apparatus is provided with a main body control portion that controls operation of the apparatus main body. And, the option device is provided with an option control portion that controls operation of the option device.

For example, in the case where an option device is mounted on an image forming apparatus, the main body control portion gives an operation instruction to the option control portion, and based on the instruction from the main body control portion, the option control portion controls the operation of the option device. In this structure, control information defining a control condition of the option device is stored in the apparatus main body. And, the main body control portion makes the apparatus main body perform the operation in accordance with the control condition of the option device.

As an example, in a case where the option device is a post-process device, control information defining a control condition of the post-process device is stored in the apparatus main body. Here, the control condition of the post-process device is decided based on specifications (sheet conveyance speed, structure and disposition position of a portion that executes various post-processes) of the post-process device. For example, as the control condition of the post-process device, a between-sheets distance (distance between a rear end of a preceding sheet and a tip end of a following sheet) when introducing continuously a plurality of sheets into the post-process device is decided based the specifications of the post-process device. And, based on the control information stored in the apparatus main boy, the main body control portion controls the operation (operation of introducing sheets into the post-process device) of the apparatus main body such that the between-sheets distance when introducing continuously a plurality of sheets into the post-process device becomes the between-sheets distance suitable for the specifications of the post-process device.

If the apparatus main body performs operation unsuitable for the specifications of the option device or the option device is given an operation instruction unsuitable for the option device from the main body control portion, the option device mounted on the image forming apparatus determines occurrence of an unsuitableness error and stops the operation. For example, in the case where the option device is a post-process device, if a plurality of sheets are introduced continuously at a between-sheets distance unsuitable for the specifications of the post-process device, an unsuitableness error occurs. The reason for the occurrence of such an unsuitableness error occurring is that the control information (which defines the control condition of the option device) stored in the apparatus main body is unsuitable for the specifications of the option device.

Accordingly, in the case where an unsuitableness error occurs, it is necessary to update the control information stored in the apparatus main body to control information suitable for the specifications of the option device. For example, when updating the control information stored in the apparatus main body, a debug terminal and the like are connected to the main body control portion, and the updating is performed by means of the debug terminal.

Here, in a development stage of the image forming apparatus and option device, various works on the apparatus main body and the option device are advanced by different developers; accordingly, an unsuitableness error is liable to occur. And, whenever an unsuitableness error occurs, it is required to perform the work of updating the control information stored in the apparatus main body. Accordingly, it is onerous and inconvenient for the developers of the image forming apparatus.

Besides, an unsuitableness error is likely to occur after shipment to the market. For example, if an unsuitableness error occurs after the shipment to the market, it becomes necessary for a service person to perform the update work; accordingly, it takes a long time before the update work is performed. Because of this, a state, where it is impossible for a user of the image forming apparatus to perform printing by using the option device, continues for some time, which is inconvenient.

SUMMARY

An image forming apparatus according to the present disclosure includes an option device, a printing portion, a main body storage portion, an I/F portion, and a main body control portion. The option device includes an option control portion and an option storage portion. The printing portion prints an image onto a sheet. The main body storage portion stores control information which defines a control condition of the option device. The I/F portion is designed to allow communication with the option device mounted on the image forming apparatus. The main body control portion makes the printing portion perform operation in accordance with the control condition of the option device, and based on the control condition of the option device, gives an operation instruction to the option control portion via the I/F portion. And, the option storage portion stores control information which defines a control condition suitable for specifications of the option device, and in a case where an unsuitableness error, which is an error caused by the control information stored in the main body storage portion being unsuitable for the specifications of the option device, occurs in the option device, the option control portion transmits error information indicating content of the occurring unsuitableness error and the control information stored in the option storage portion to the main body control portion via the I/F portion. Besides, the main body control portion updates the control information based on the control information transmitted from the option control portion such that the control information stored in the main body storage portion becomes the control information suitable for the specifications of the option device.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

As to an image forming apparatus according to an embodiment of the present disclosure, a multi-function machine is described as an example.

<Whole Structure of Multi-Function Machine>

Figure 1:
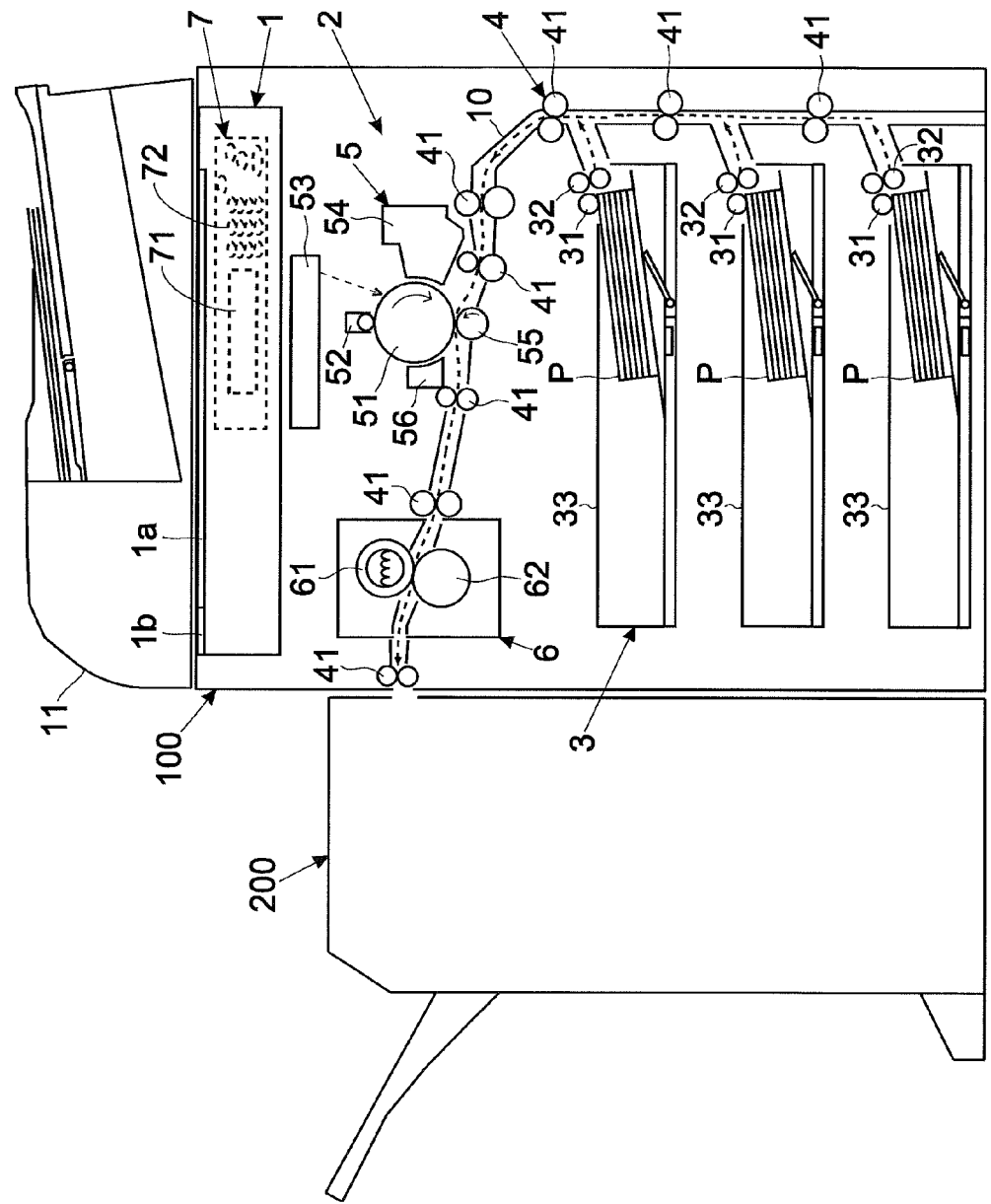
FIG. 1 is a schematic view showing an example of a multi-function machine according to an embodiment of the present disclosure.

As shown in FIG. 1, a multi-function machine 100 (which corresponds to an "image forming apparatus") includes an image reading portion 1 and a printing portion 2.

The image reading portion 1 reads a document placed on a contact glass 1a for placement and reading to generate image data of the document. Besides, a document conveyance unit 11, which conveys a document onto a contact glass 1b for conveyance and reading, is mounted on the image reading portion 1. In a case of conveying a document onto the contact glass 1b by means of the document conveyance unit 11, the image reading portion 1 reads the document passing on the contact glass 1b to generate image data of the document.

The printing portion 2 is composed of a sheet feeding portion 3, a sheet conveyance portion 4, an image forming portion 5, and a fixing portion 6. And, the printing portion 2 conveys a sheet P along a main body conveyance path 10 to print an image based on image data (e.g., image data of a document obtained by reading of the image reading portion 1) onto the sheet P.

The sheet feeding portion 3 includes a pickup roller 31 and a pair of sheet feeding rollers 32, and feeds the sheet P stored in the sheet cassette 33 to the main body conveyance path 10. The sheet conveyance portion 4 includes a plurality of pairs of conveyance rollers 41, and conveys the sheet P along the main body conveyance path 10.

The image forming portion 5 includes a photosensitive drum 51, an electrifying device 52, a light exposure device 53, a developing device 54, a transfer roller 55, and a cleaning device 56. And, the image forming portion 5 forms a toner image based on image data and transfers the toner image onto the sheet P. The fixing portion 6 includes a heat roller 61 and a press roller 62, heats and presses the toner image transferred to the sheet P to fix the toner image.

Besides, the multi-function machine 100 includes an operation panel 7. The operation panel 7 includes a liquid crystal display panel 71 with a touch panel. The liquid crystal display panel 71 displays software keys and messages for accepting various settings. Further, the operation panel 7 is also provided with hardware keys 72 such as a ten-key pad and a start key and the like.

Here, the multi-function machine 100 is able to mount thereon a post-process device 200 as an option device. In a case where the post-process device 200 is mounted on the multi-function machine 100, it becomes possible to apply a post-process to a printed sheet P by means of the post-process device 200. For example, the post-process device 200 applies, to the printed sheet P, post-processes such as a punch process, a staple process, a classification process and the like.

<Structure of the Post-Process Device>

Figure 2:
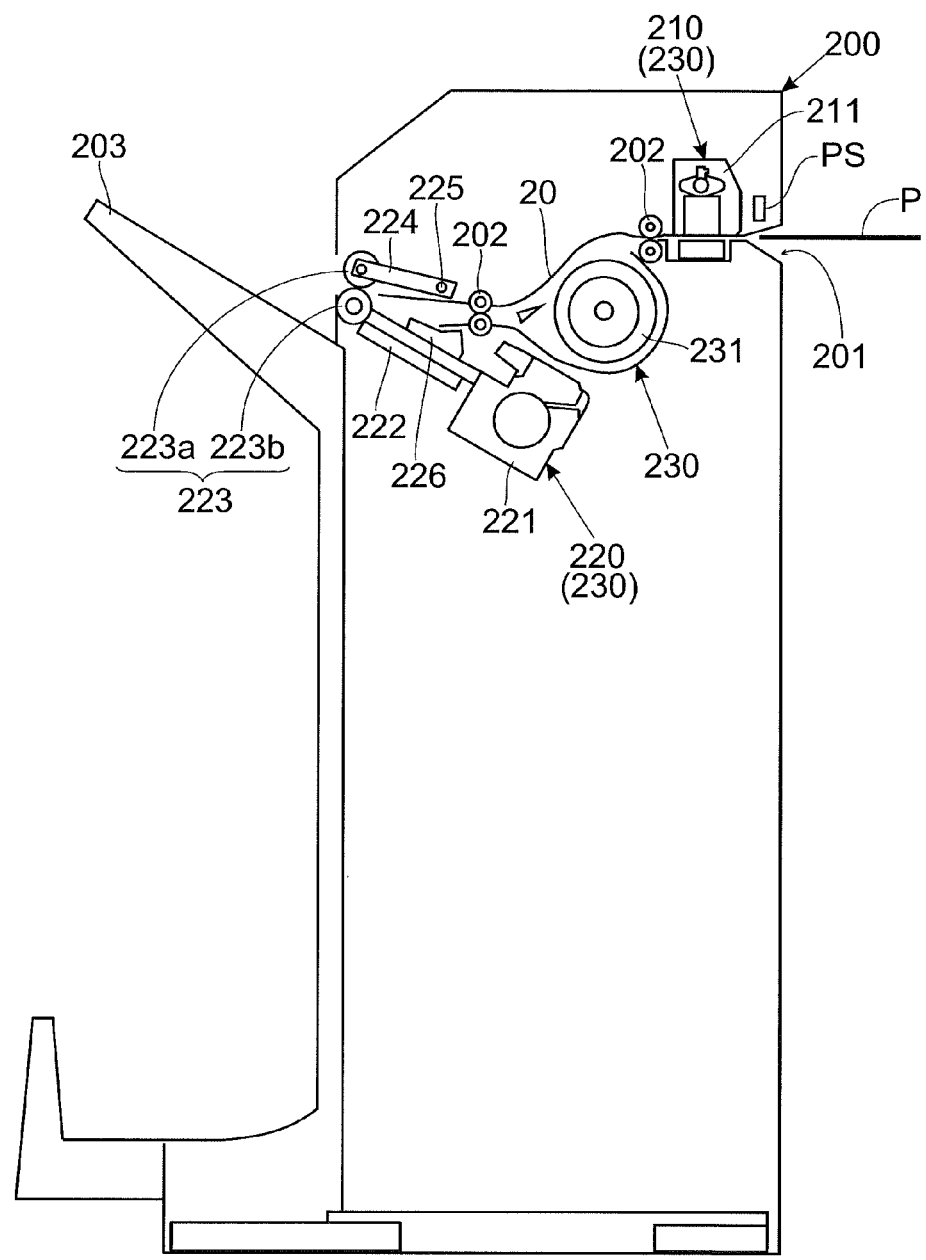
FIG. 2 is a schematic view showing an example of a post-process device that can be mounted on a multi-function machine according to an embodiment of the present disclosure.

As shown FIG. 2, the post-process device 200 has an introduction port 201 that serves as an accepting aperture for the printed sheet P (hereinafter, the printed sheet P introduced into the post-process device 200 is simply called the "sheet P"). And, the post-process device 200 conveys the sheet P introduced from the introduction port 201 along a post-process conveyance path 20 and applies a post-process to the sheet P. Because of this, the post-process device 200 is provided with a plurality of pairs of conveyance rollers 202 for conveying the sheet P along the post-process conveyance path 20.

The post-process device 200 is provided with a punch process portion 210 and a staple process portion 220 as portions that execute post-processes. In the meantime, the punch process portion 210 and the staple process portion 220 each correspond to a "post-process execution portion." In the following description, there is a case where the punch process portion 210 and the staple process portion 220 are called a post-process execution portion 230.

The punch process portion 210 includes a punch unit 211, and is disposed in an upstream side (near the introduction portion 201) of the post-process conveyance path 20. And, the punch unit 211 applies a punch process to the sheet P introduced from the introduction port 201.

Besides, the staple process portion 220 includes a staple unit 221 and a process tray 222, and is disposed in a downstream side of the post-process conveyance path 20. And, the staple unit 221 applies a staple process to a bundle of sheets (a bundle of a plurality of sheets P) loaded on the process tray 222. In the meantime, the staple unit 221 is movable in a direction (direction perpendicular to the paper surface) perpendicular to a conveyance direction, and moves to a position where to perform the stapling.

The process tray 222 is inclined obliquely downward from its one end (near sheet delivery tray 203) to the other end. And, near the one end of the process tray 222, a pair of sheet delivery rollers 223 (upper roller 223a and lower roller 223b) for delivering the sheet P to the sheet delivery tray 203 are disposed. Besides, one end of an arm 224 is connected to the upper roller 223a, and a swing shaft 225 is connected to the other end of the arm 224. In this way, if the one end of the arm 224 is swung upward about the swing shaft 225 used as a fulcrum, the upper roller 223a moves upward; accordingly, it is possible to separate the upper roller 223a form the lower roller 223b. On the other hand, if the one end of the arm 224 is swung downward about the swing shaft 225 used as the fulcrum, the upper roller 223a moves downward; accordingly, it is possible to make the upper roller 223a approach the lower roller 223b.

When loading the sheet P onto the process tray 222, the upper roller 223a is separated from the lower roller 223b, and a tip end of the sheet P is made to go between the upper roller 223a and the lower roller 223b. Thereafter, for example, by means of a not-shown paddle, the sheet P is moved obliquely downward along a load surface of the process tray 222 (or the sheet P moves obliquely downward under its own weight along the load surface of the process tray 222).

When delivering the sheet P from the process tray 222 to the sheet delivery tray 203, the upper roller 223a is made to approach the lower roller 223b, whereby the upper roller 223a and the lower roller 223b sandwich the sheet P. In this way, by rotating the upper roller 223a and the lower roller 223b, the sheet P loaded on the process tray 222 is delivered to the sheet delivery tray 203.

Besides, the process tray 222 is provided with a guide 226 movable in a width direction (direction perpendicular to the conveyance direction) of the sheet P. By providing the process tray 222 with such guide 226, it is possible to shift the sheet P to be delivered to the sheet delivery tray 222 in the width direction (possible to classify the sheet P).

In the meantime, an intermediate portion (between the punch process portion 210 and the staple process portion 220) of the post-process conveyance path 20 is provided with an evacuation portion 230 that evacuates temporarily the sheet P sent from the punch process portion 210. The evacuation portion 230 includes an evacuation drum 231 that is supported to rotate, and by winding the sheet P around the evacuation drum 231, the sheet P sent from the punch process portion 210 is temporarily evacuated (the conveyance of the sheet P to the staple process portion 220 is deferred). In this way, when a preceding copy of sheet bundle is being processed by the staple process portion 220, it is possible to deter the sheets P of a following copy of sheet bundle from being conveyed to the staple process portion 220.

<Hardware Structure of the Multi-Function Machine>

Figure 3:
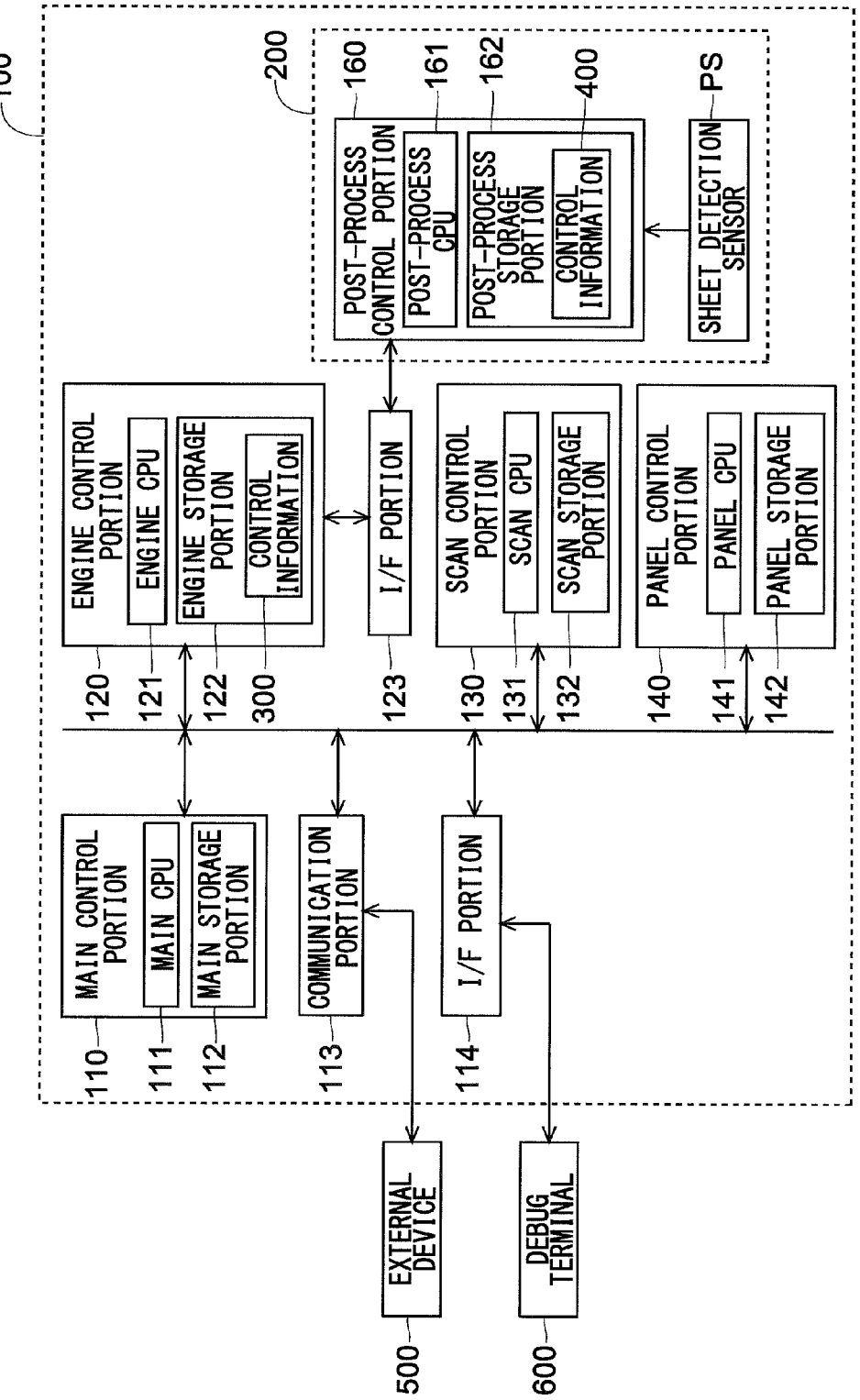
FIG. 3 is a block diagram showing an example of a hardware structure of a multi-function machine (post-process device) according to an embodiment of the present disclosure.

As shown in FIG. 3, the multi-function machine 100 includes a main control portion 110. The main control portion 110 includes a main CPU 111 and a main storage portion 112. The main storage portion 112 stores a program for operating the main CPU 111. And, the main control portion 110 (main CPU 111) performs comprehensive control, image process control and the like of the multi-function machine 100. Besides, the main control portion 110 is connected to an engine control portion 120, a scan control portion 130, and a panel control portion 140, and gives an instruction to each control portion.

The engine control portion 120 includes an engine CPU 121 and an engine storage portion 122. The engine storage portion 122 stores a program for controlling a printing operation of the printing portion 2 and control information 300 that defines a control condition of the post-process device 200. And, the engine control portion 120 (engine CPU 121) accepts an instruction from the main control portion 110 to make the printing portion 2 perform a printing operation (e.g., operation of introducing the sheet P into the option device 200) in accordance with the control condition of the post-process device 200 defined by the control information 300, and gives an operation instruction, which is based on the control condition of the post-process device 200 defined by the control information 300, to the post-process device 200. In the meantime, the engine control portion 120 (engine CPU 121) corresponds to a "main control portion," and the engine storage portion 122 corresponds to a "main body storage portion."

An I/F portion 123 is connected to the engine control portion 120. The post-process device 200 is mounted onto the multi-function machine 100, whereby the I/F portion 123 is connected to the post-process device 200 for communication. And, the engine control portion 120 communicates with the post-process device 200 via the I/F portion 123.

The scan control portion 130 includes a scan CPU 131 and a scan storage portion 132. The scan storage portion 132 stores a program for operating the scan CPU 131. And, the scan control portion 130 (scan CPU 131) accepts an instruction from the main control portion 110 to control a reading operation of the image reading portion 1.

The panel control portion 140 includes a panel CPU 141 and a panel storage portion 142. The panel storage portion 142 stores a program for operating the panel CPU 141. And, the panel control portion 140 (panel CPU 141) accepts an instruction from the main control portion 110 to control a display operation of the operation panel 7 and detect an operation performed on the operation panel 7.

Besides, the main control portion 110 is connected to a communication portion 113. The communication portion 113 is connected to an external device 500 (server or user terminal) via a network for communication. And, the communication portion 113 accepts an instruction from the main control portion 110 to receive image data from the external device 500 and transmit image data to the external device 500.

Further, the main control portion 110 is connected to an I/F portion 114 to which a debug terminal 600 and the like are connected. For example, the multi-function machine 100 incorporates a maintenance mode. And, it is possible to perform a shift to the maintenance mode by connecting the debug terminal 600 to the I/F portion 114 and operating the debug terminal 600.

The post-process device 200 includes a post-process control portion 160. The post-process control portion 160 includes a post-process CPU 161 and a post-process storage portion 162. The post-process storage portion 162 stores a program for operating the post-process CPU 161. And, the post-process control portion 160 (post-process CPU 161) accepts an operation instruction based on the control information 300 from the engine control portion 120 to control a post-process operation of the post-process device 200. In the meantime, the post-process control portion 160 (post-process CPU 161) corresponds to an "option control portion," and the post-process storage portion 162 corresponds to an "option storage portion."

Besides, a sheet detection sensor PS for detecting presence of the sheet P is connected to the post-process control portion 160. A plurality of the sheet detection sensors PS are disposed, at least one sheet detection sensor PS is disposed at the introduction port 201 (see FIG. 2) and used to detect the sheet P introduced into the post-process device 200.

<Error Occurrence Detection at the Post-Process Device>

The control information 300 stored in the engine storage portion 122 includes data that defines a between-sheets distance when continuously introducing a plurality of sheets P into the post-process device 200 and data that defines a between-copies distance when continuously introducing the sheets P of a plurality of copies of sheet bundles into the post-process device 200. In the meantime, the between-sheets distance is a distance between a rear end of a preceding sheet P and a tip end of a following sheet P in the case where a plurality of sheets P are introduced continuously, and the between-copies distance is a distance between a rear end of the last sheet P of a preceding copy and a tip end of the first sheet P of a following copy in the case where a plurality of copies of sheet bundles are introduced continuously. And, the engine control portion 120 controls the printing operation (operation of introducing the sheets P into the post-process device 200) of the printing portion 2 such that the between-sheets distance and between-copies distance when introducing the sheets P into the post-process device 200 become values defined by the control information 300.

In the meantime, the between-sheets distance when continuously introducing the sheets P into the post-process device 200 and the between-copies distance when continuously introducing the sheets P of a plurality of copies of sheet bundles into the post-process device 200 are decided based on specifications (conveyance speed of the sheets P, respective structures and dispositions and the like of the punch process portion 210 and staple process portion 220) of the post-process device 200.

In the case where a plurality of sheets P are continuously introduced, the post-process control portion 160 detects passage of a rear end of a preceding sheet P and arrival of a tip end of a following sheet P at a detection position of the sheet detection sensor PS disposed at the introduction port 201. Besides, in the case where the sheets P of a plurality of copies of sheet bundles are continuously introduced, the post-process control portion 160 detects passage of a rear end of the last sheet P of a preceding copy and arrival of a tip end of the first sheet P of a following copy at the detection position of the sheet detection sensor PS disposed at the introduction port 201.

And, in the case where a plurality of sheets P are continuously introduced, the post-process control portion 160 detects a distance (between-sheets distance) between the preceding sheet P and the following sheet P based on a period required from the passage detection of the rear end of the preceding sheet P to the arrival detection of the tip end of the following sheet P and a sheet conveyance speed. Besides, in the case where the sheets P of a plurality of copies of sheet bundles are continuously introduced into the post-process device 200, the post-process control portion 160 detects a distance (between-copies distance) between the last sheep P of the preceding copy and the first sheet P of the following copy.

Thereafter, the post-process control portion 160 determines whether the detected between-sheets distance and between-copies distance are suitable for the specifications of the post-process device 200 or not. As a result of this, if the detected between-sheets distance is not suitable for the specifications of the post-process device 200, the post-process control portion 160 transmits error information, which indicates occurrence of an unsuitableness error (hereinafter, called a between-sheets distance error) caused by the between-sheets distance being unsuitable for the specifications of the post-process device 200, to the engine control portion 120, and if the detected between-copies distance is not suitable for the specifications of the post-process device 200, the post-process control portion 160 transmits error information, which indicates occurrence of an unsuitableness error (hereinafter, called a between-copies distance error) caused by the between-copies distance being unsuitable for the specifications of the post-process device 200, to the engine control portion 120. Upon receiving the transmission, the engine control portion 120 transmits an operation stop instruction to the post-process device 160 to stop a post-process performed by the post-process execution portion 230. Besides, the engine control portion 120 stops the printing operation of the printing portion 2.

As another example, the post-process device 200 incorporates a plurality of different kinds of modes in which different post-processes are executed; accordingly, there is a case where a mode of a post-process to be executed between a preceding job and a following job is switched. For example, there is a case where a punch process is performed in the preceding job and a staple process is performed in the following job; or a case where a staple position of the staple process in the preceding job and a staple position of the staple process in the following job are different from each other. In these cases, after the post-process of the preceding job is ended, the post-process control portion 160 accepts an instruction for starting a preparation process for the post-process to be performed in the following job to start the preparation process. And, after the preparation process is ended, the post-process control portion 160 makes the post-process execution portion 230 perform the post-process to be performed in the following job. For example, in the case where a punch process is performed in the preceding job; thereafter, the post-process of the following job is switched to a staple process, after the post-process of the preceding job is ended, as the preparation process, the post-process control portion 160 moves the staple unit 221 to a suitable position.

In the meantime, also in a case where a sheet size in the preceding job and a sheet size in the following job are different from each other, after the post-process of the preceding job is ended, the post-process control portion 160 accepts, from the engine control portion 120, an instruction for starting a preparation process to start the preparation process to be performed in the following job. And, after the preparation process is completed, the post-process control portion 160 makes the post-process execution portion 230 perform the post-process to be performed in the following job.

Here, the control information 300 stored in the engine storage portion 122 includes data that indicates a timing to output the instruction for starting the preparation process. And, in a case where the engine control portion 120 instructs the post-process control portion 160 to switch the mode of the post-process to be executed between the preceding job and the following job, the engine control portion 120 transmits the instruction for starting the preparation process to the post-process control portion 160 at the timing defined by the control information 300. Besides, also in the case where a sheet size in the preceding job and a sheet size in the following job are different from each other, the engine control portion 120 transmits the instruction for starting the preparation process to the post-process control portion 160 at the timing defined by the control information 300.

However, if the timing defined by the control information 300 is not suitable for the specifications of the post-process device 200, the instruction for starting the preparation process is not transmitted to the post-process control portion 160 at the suitable timing. Accordingly, after the post-process of the preceding job is ended, the sheet P arrives at a process position of the post-process to be performed in the following job in a state where the post-process control portion 160 does not accept the instruction for starting the preparation process (state where the preparation process is not completed). In this case, the post-process control portion 160 determines that an unsuitableness error (hereinafter, called an instruction timing error), which is caused by the timing to receive the instruction for starting the preparation process being unsuitable for the specifications of the post-process device 200, occurs, and transmits error information indicating occurrence of the instruction timing error to the engine control portion 120.

Besides, as another example, if the post-process control portion 160 goes to a standby state that is a state where it is possible to accept the sheet P (state where it is possible to perform the post-process), the post-process control portion 160 transmits a standby notification, which indicates the shift to the standby state, to the engine control portion 120. And, usually, the engine control portion 120 accepts the standby notification from the post-process control portion 160 to make the printing portion 2 perform the introduction of the sheet P into the post-process device 200.

However, if the control condition defined by the control information 300 is not suitable for the specifications of the post-process device 200, there is a case where even if the standby notification is not transmitted to the engine control portion 120, namely, even if the post-process device 200 is in a non-standby state that is not the standby state, the engine control portion 120 makes the printing portion 2 perform the introduction of the sheet P into the post-process device 200.

The reason is that the engine control portion 120 does not monitor the standby notification transmitted from the post-process device 200.

As described above, in the case where the introduction of the sheet P into the post-process device 200 is performed in the state where the standby notification is not transmitted to the engine control portion 120, the post-process control portion 160 determines that an unsuitableness error (hereinafter, called a standby error), which is caused by the post-process 200 accepting the introduction of the sheet P in the non-standby state, occurs. And, the post-process control portion 160 transmits error information indicating occurrence of the standby error to the engine control portion 120.

Besides, as another example, in a case where the post-process control portion 160 is instructed by the engine control portion 120 to perform the post-process (staple process or classification process) that requires the loading of the sheet P into the process tray 222, the post-process control portion 160 accepts a last sheet notification, which indicates that the last sheet P of the sheets P targeted for the process is introduced, to recognize that the last sheet P is introduced. And, if the last sheet P is loaded into the process tray 222 and the post-process for a sheet bundle including the last sheet P is ended, the post-process control portion 160 delivers the sheet bundle including the last sheet P into the sheet delivery tray 203. Here, there is an upper limit of the number of sheets P capable of being loaded into the process tray 222, and the maximum number of sheets P loaded into the process tray 222 is decided in accordance with the specifications of the post-process device 200.

However, if the control condition defined by the control information 300 is not suitable for the specifications of the post-process device 200, there is a case where the engine control portion 120 accepts an execution instruction for the post-process that requires the loading of a number of sheets P exceeding the maximum loading number (equal to a suitable number described later) and the number of sheets P loaded into the process tray 222 exceeds the maximum loading number. For example, the post-process control portion 160 counts the number of the sheets P loaded into the process tray 222 based on an output from the sheet detection sensor PS, and determines whether the number of the sheets P loaded in the process tray 222 exceeds the maximum loading number or not.

As described above, in the case where the number of the sheets P loaded into the process tray 222 exceeds the maximum loading number, namely, a case where the post-process control portion 160 does not accept the last sheet notification from the engine control portion 120 before the number of the sheets P loaded into the process tray 222 reaches the maximum loading number, the post-process control portion 160 determines that an unsuitableness error (hereinafter, called a maximum loading number error), which is caused by the post-process control portion 160 not-accepting the last sheet notification from the engine control portion 120, occurs. And, the post-process control portion 160 transmits error information indicating occurrence of the maximum loading number error to the engine control portion 120.

<Update of the Control Information>

In the case where an unsuitableness error, which is caused by the control information 300 stored in the engine storage portion 122 being unsuitable for the specifications of the post-process device 200, occurs, the control information 300 stored in the engine storage portion 122 must be updated to information that is suitable for the specifications of the post-process device 200.

Accordingly, in the present embodiment, as shown in FIG. 3, the control information 400, which defines the control condition suitable for the specifications of the post-process device 200, is stored beforehand in the post-process storage portion 162. The control information 400 includes data such as a table and the like for rewriting the control information 300 stored in the engine storage portion 122 to the information suitable for the specifications of the post-process device 200. For example, the control information 400 includes: data which indicates a suitable between-sheets distance that is a between-sheets distance to be disposed between a rear end of a preceding sheet P and a tip end of a following sheet P in a case where a plurality of sheets P are continuously introduced; and data which indicates a suitable between-copies distance that is a between-copies distance to be disposed between a rear end of the last sheet P of a preceding copy and a tip end of the first sheet P of a following copy in a case where the sheets P of a plurality of copies of sheet bundles are continuously introduced. Besides, the control information 400 includes data indicating a suitable instruction timing which is a timing used to output an instruction for starting a preparation process in a case where a mode of a post-process to be executed between a preceding job and a following job is switched; or in a case where a sheet size in the preceding job and a sheet size in the following job are different from each other. Further, the control information 400 includes data indicating a suitable number of sheets that is the maximum loading number of sheets P capable of loaded in the process tray 222.

And, when an unsuitableness error occurs, the control information 400 is transmitted from the post-process control portion 160 to the engine control portion 120 via the I/F portion 123. Besides, when the engine control portion 120 receives the control information 400, updating of the control information 300 based on the control information 400 is performed by the engine control portion 120 such that the control information 300 stored in the engine storage portion 122 becomes suitable for the specifications of the post-process device 200. In other words, the control information 300 stored in the engine storage portion 122 is rewritten to the control information 400. Or, only part (e.g., between-sheets distance data or between-copies distance data) of the control information 300 stored in the engine storage portion 122 is corrected.

Describing specifically, in the case where a between-sheets distance error occurs, the post-process control portion 160 transmits the control information 400, which includes the data indicating the suitable between-sheets distance, and the error information to the engine control portion 120. The engine control portion 120 receives the information to update the control information 300 based on the control information 400, thereby thereafter setting the between-sheets distance, when continuously introducing a plurality of sheets P into the post-process device 200, to the suitable between-sheets distance. Besides, in the case where a between-copies distance error occurs, the post-process control portion 160 transmits the control information 400, which includes the data indicating the suitable between-copies distance, and the error information to the engine control portion 120. The engine control portion 120 receives the information to update the control information 300 based on the control information 400, thereby thereafter setting the between-copies distance, when continuously introducing the sheets P of a plurality of copies of sheet bundles into the post-process device 200, to the suitable between-copies distance.

Besides, in the case where an instruction timing error occurs, the post-process control portion 160 transmits the control information 400, which includes the data indicating the suitable instruction timing, and the error information to the engine control portion 120. The engine control portion 120 receives the information to update the control information 300 based on the control information 400. And, in the case where a mode of a post-process to be performed between a preceding job and a following job is switched (case where a sheet size in the preceding job and a sheet size in the following job are different from each other), the engine control portion 120 transmits an instruction for starting a post-process to the post-process control portion 160 at the suitable instruction timing.

Besides, in the case where a standby error occurs, the post-process control portion 160 transmits the control information 400, which includes occurrence of the standby error, and the error information to the engine control portion 120. In this case, the control information 400 includes data which is used to rewritten the control information 300 such that a standby notification is monitored by the engine control portion 120. The engine control portion 120 receives the information to update the control information 300 based on the control information 400, thereby thereafter monitoring the standby notification from the post-process control portion 160 when the sheet P is introduced into the post-process device 200. In other words, the engine control portion 120 accepts the standby notification from the post-process control portion 160, thereafter, makes the printing portion 2 perform the introduction of the sheet P into the post-process device 200.

Besides, in the case where a maximum loading number error occurs, the post-process control portion 160 transmits the control information 400, which includes data indicating a suitable number, and the error information to the engine control portion 120. The engine control portion 120 receives the information to update the control information 300 based on the control information 400, and thereby thereafter does not accept an execution instruction of a post-process that requires the loading of a plurality of sheets P exceeding the suitable number into the process tray 222. For example, the engine control portion 120 transmits the data indicating the suitable number to the panel control portion 140 to prohibit the operation panel 7 from accepting an execution instruction of the post-process that requires the loading of a plurality of sheets P exceeding the suitable number into the process tray 222. In the meantime, this communication may be performed via the main control portion 110.

In the meantime, in the case where the engine control portion 120 updates the control information 300 based on the control information 400 transmitted from the lost-process control portion 160, an update history of the control information 300 is stored into the engine storage portion 122. Or, the update history of the control information 300 may be stored into the main storage portion 112.

And, for example, if the operation panel 7 accepts a predetermined operation from an operator, the operation panel 7 displays the update history of the control information 300. In this structure, the operation panel 7 corresponds to a "display portion." Or, in the case where the debug terminal 600 is mounted on the I/F portion 114, it is also possible to make the debug device 600 display the update history of the control information 300.

<Control Flow when Updating the Control Information>

Hereinafter, with reference to a flow chart of FIG. 4, a control flow when updating the control information 300 stored in the engine storage portion 122 is described.

Figure 4:
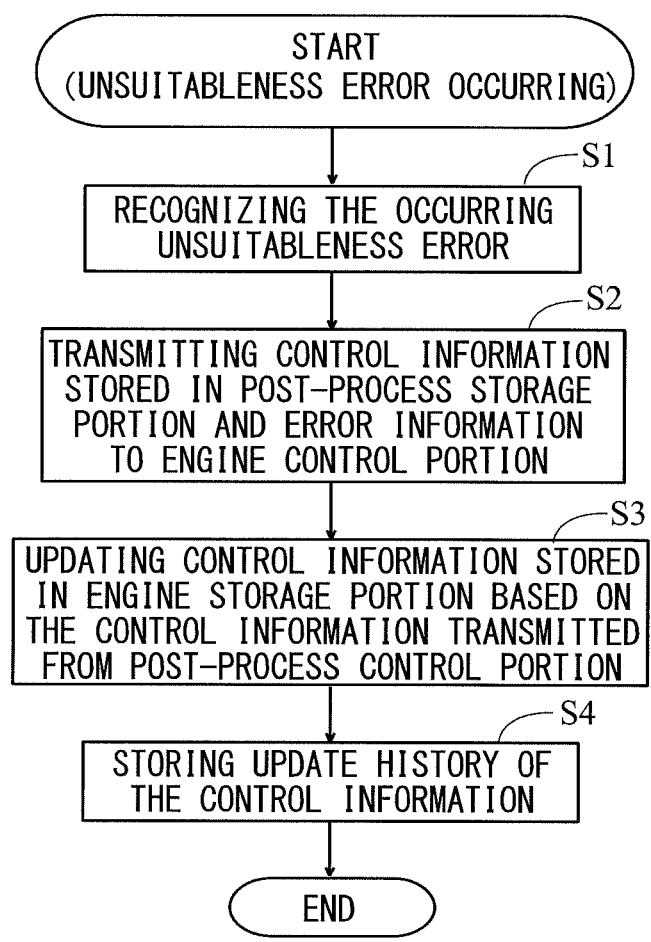
FIG. 4 is a flow chart for describing an update flow of control information performed by a multi-function machine according to an embodiment of the present disclosure.

First, at a start time of the flow chart of FIG. 4, it is assumed that an image is printed onto the sheet P at the printing portion 2 and the printed sheet P is introduced into the post-process device 200. And, after the sheet P is introduced into the post-process device 200, when an unsuitableness error, which is caused by the control information 300 stored in the engine storage portion 122 being unsuitable for the specifications of the post-process device 200, occurs, the flow chart of FIG. 4 starts.

In a step S1, the post-process control portion 160 identifies the suitableness error occurring in the post-process device 200. And, in a step S2, the post-process control portion 160 transmits the control information 400, which includes data for solving the occurring unsuitableness error (e.g., data indicating the suitable between-sheets distance in a case where the occurring unsuitableness error is a between-sheets distance error), and the error information to the engine control portion 120.

Thereafter, in a step S3, the engine control portion 120 updates the control information 300 stored in the engine storage portion 122 based on the control information 400. For example, if the control information 400 includes the data that indicates the suitable between-sheets distance, the between-sheets distance defined by the control information 300 is rewritten to the suitable between-sheets distance.

Next, in a step S4, the engine control portion 120 stores the update history of the control information 300 into the engine storage portion 122. For example, as the update history, an update time and date, content of the occurring error, data rewritten by the update and the like are stored.

As described above, the multi-function machine 100 (image forming apparatus) according to the present embodiment comprises: the post-process device 200 (option device) that includes the post-process control portion 160 (option control portion) and the post-process storage portion 162 (option storage portion); the printing portion 2 that prints an image onto the sheet P; the engine storage portion 122 (main body storage portion) that stores the control information 300 which defines the control condition of the post-process device 200; the I/F portion 123 for communicating with the post-process device 200 mounted on the multi-function machine 100; and the engine control portion 120 (main body control portion) that makes the printing portion 2 perform the operation in accordance with the control condition of the post-process device 200 and gives, via the I/F portion 123, an operation instruction to the post-process control portion 160 based on the control condition of the post-process device 200.

And, the post-process storage portion 162 of the post-process device 200 stores the control information 400 that defines the control condition suitable for the specifications of the post-process device 200, and in the case where an unsuitableness error, which is an error caused by the control information 300 stored in the engine storage portion 122 being unsuitable for the specifications of the post-process device 200, occurs in the post-process device 200, the post-process control portion 160 of the post-process device 200 transmits, via the I/F portion 123, the error information indicating the content of the occurring unsuitableness error and the control information 400 to the engine control portion 120. The engine control portion 120 receives the control information 400 to update the control information 300 based on the control information 400 such that the control information 300 stored in the engine storage portion 122 becomes suitable for the specifications of the post-process device 200.

Specifically, the control information 400 includes the data that indicates the suitable between-sheets distance which is the between-sheets distance to be disposed between a rear end of a preceding sheet P and a tip end of a following sheet P in the case where a plurality of sheets P are continuously introduced into the post-process device 200. And, in the case where a plurality of sheets P are continuously introduced, the post-process control portion 160 detects a between-sheets distance based on the output from the sheet detection sensor PS, and if the detected between-sheets distance is not suitable for the specifications of the post-process device 200, the post-process control portion 160 determines that a between-sheets distance error as an unsuitableness error occurs and transmits the control information 400, which includes the data indicating the suitable between-sheets distance, and the error information to the engine control portion 120. The engine control portion 120 receives the control information 400 to update the control information 300 based on the control information 400, thereby thereafter setting the between-sheets distance, when continuously introducing a plurality of sheets into the post-process device 20, to the suitable between-sheets distance.

Besides, the control information 400 includes the data that indicates the suitable between-copies distance which is the between-copies distance to be disposed between a rear end of the last sheet P of a preceding copy and a tip end of the first sheet P of a following copy in the case where sheets P of a plurality of copies of sheet bundles are continuously introduced into the post-process device 200. And, in the case where the sheets P of a plurality of copies of sheet bundles are continuously introduced, the post-process control portion 160 detects a between-copies distance based on the output from the sheet detection sensor PS, and if the detected between-copies distance is not suitable for the specifications of the post-process device 200, the post-process control portion 160 determines that a between-copies distance error as an unsuitableness error occurs and transmits the control information 400, which includes the data indicating the suitable between-copies distance, and the error information to the engine control portion 120. The engine control portion 120 receives the control information 400 to update the control information 300 based on the control information 400, thereby thereafter setting the between-copies distance, when continuously introducing the sheets P of a plurality of copies of sheet bundles into the post-process device200, to the suitable between-copies distance.

Besides, the control information 400 includes the data that indicates the suitable instruction timing which is a timing to output the instruction for starting the preparation process. And, in the case where a mode of a post-process executed between a preceding job and a following job is switched, or in the case where a sheet size in the preceding job and a sheet size in the following job are different from each other, after the post-process of the preceding job is ended, if the sheet P arrives at the process position of the post-process to be performed in the following job in the state where the instruction for starting the preparation process is not received, the post-process control portion 160 determines that an instruction timing error as an unsuitableness error occurs, and transmits the control information 400, which includes the data indicating the suitable instruction timing, and the error information to the engine control portion 120. The engine control portion 120 receives the control information 400 to update the control information 300 based on the control information 400, thereby thereafter transmitting the instruction for starting the preparation process to the post-process control portion 160 at the suitable instruction timing in the case where a mode of a post-process executed between a preceding job and a following job is switched and in the case where a sheet size in the preceding job and a sheet size in the following job are different from each other.

Besides, in the case where the sheet P is introduced into the post-process device 200 in a non-standby state that is not a standby state, the post-process control portion 160 determines that a standby error as an unsuitableness error occurs, and transmits the control information 400, which includes the data for rewriting the control information 300, and the error information to the engine control portion 120 such that the monitoring of a standby notification is performed by the engine control portion 120. The engine control portion 120 receives the control information 400 to update the control information 300 based on the control information 400, thereby thereafter monitoring the standby notification when introducing the sheet P into the post-process device 200.

Besides, the control information 400 includes the data that indicates the suitable number of sheets which is the maximum number of sheets P capable of being loaded in the process tray 222. And, in the case where the post-process control portion 160 does not accept a last sheet notification from the engine control portion 120 before the number of sheets P loaded in the process tray 122 reaches the suitable number, the post-process control portion 160 determines that a maximum load number error as an unsuitableness error occurs, and transmits the control information 400, which includes the data indicating the suitable number, and the error information to the engine control portion 120. The engine control portion 120 receives the control information 400 to update the control information 300 based on the control information 400, and thereby thereafter does not receive an execution instruction of the post-process which requires the loading of a number of sheets P exceeding the suitable number into the process tray 222.

According to this, even if an unsuitableness error occurs in the development stage of the multi-function machine 100 and post-process device 200, the control information 300 stored in the engine storage portion 122 is automatically updated; accordingly, it is unnecessary to perform the update work of the control information 300 stored in the engine storage portion 122. Accordingly, it is possible to improve the convenience (work efficiency) for the developers of the multi-function machine 100.

Besides, even if an unsuitableness error occurs after the shipment to the market, the control information 300 stored in the engine storage portion 122 is automatically updated with no help from a service person; accordingly, it becomes possible to immediately perform the printing by using the post-process device 200. Accordingly, also the convenience for the user of the multi-function machine 100 improves.

Besides, in the present embodiment, as described above, in the case where the control information 300 is updated based on the control information 400, the update history of the control information 300 is stored into the engine storage portion 122. Besides, the operation panel 7 (display portion) is disposed to display the update history of the control information 300. In this way, even if the control information 300 stored in the engine storage portion 122 is automatically updated, it is possible to easily perform a confirmation work on what kind of update is carried out.

It should be considered that the embodiment disclosed this time is an example in all respects and is not limiting. The scope of the present disclosure is not indicated by the above description of the embodiment but by the claims, and all modifications within the scope of the claims and the meaning equivalent to the claims are covered.

For example, in the above embodiment, the image forming apparatus is described as an example in which a post-process device is mounted as an option device. However, the present disclosure is also applicable to a case where the option device mounted on the image forming apparatus is a device (e.g., a sheet feeding device having a large capacity that feeds sheets to a printing portion) other than the post-process device.

What is claimed is:

1. An image forming apparatus comprising:
    an option device that includes an option control portion and an option storage portion;
    a printing portion that prints an image onto a sheet;
    a main body storage portion that stores control information which defines a control condition of the option device;
    an I/F portion for communicating with the option device mounted on the image forming apparatus, and
    a main body control portion that makes the printing portion perform operation in accordance with the control condition of the option device and gives, via the I/F portion, an operation instruction to the option control portion based on the control condition of the option device, wherein
    the option storage portion stores control information that defines a control condition suitable for specifications of the option device,
    in a case where an unsuitableness error, which is an error caused by the control information stored in the main body storage portion being unsuitable for the specifications of the option device, occurs in the option device, the option control portion transmits, via the I/F portion, error information indicating content of the occurring unsuitableness error and the control information stored in the option storage portion to the main body control portion,
    the main body control portion updates the control information stored in the main body storage portion based on the control information transmitted from the option control portion such that the control information stored in the main body storage portion becomes suitable for the specifications of the option device,
    the option device is a post-process device including a post-process execution portion that applies a post-process to the sheet introduced from the printing portion,
    based on an output from a sheet detection sensor disposed at an introduction port that serves as an accepting aperture for the sheet introduced from the printing portion, the option control portion detects the sheet introduced into the post-process device,
    the control information stored in the option storage portion includes data that indicates a suitable between-sheets distance which is a between-sheets distance to be disposed between a rear end of a preceding sheet and a tip end of a following sheet in a case where a plurality of sheets are continuously introduced into the post-process device,
    in the case where a plurality of sheets are continuously introduced, the option control portion detects a between-sheets distance based on the output from the sheet detection sensor, and if the detected between-sheets distance is not suitable for specifications of the post-process device, the option control portion determines that the unsuitableness error occurs and transmits the control information, which includes the data stored in the option storage portion and indicating the suitable between-sheets distance, and the error information to the main body control portion, and
    the main body control portion updates the control information stored in the main body storage portion based on the control information transmitted from the option control portion, thereby thereafter setting the between-sheets distance, when continuously introducing a plurality of sheets into the post-process device, to the suitable between-sheets distance.

2. The image forming apparatus according to claim 1, wherein
    the control information stored in the option storage portion includes data that indicates a suitable between-copies distance which is a between-copies distance to be disposed between a rear end of a last sheet of a preceding copy and a tip end of a first sheet of a following copy in a case where sheets of a plurality of copies of sheet bundles are continuously introduced into the post-process device,
    in the case where the sheets of a plurality of copies of sheet bundles are continuously introduced, the option control portion detects a between-copies distance based on the output from the sheet detection sensor, and if the detected between-copies distance is not suitable for the specifications of the post-process device, the option control portion determines that the unsuitableness error occurs and transmits the control information, which includes the data stored in the option storage portion and indicating the suitable between-copies distance, and the error information to the main body control portion, and
    the main body control portion updates the control information stored in the main body storage portion based on the control information transmitted from the option control portion, thereby thereafter setting the between-copies distance, when continuously introducing the sheets of a plurality of copies of sheet bundles into the post-process device, to the suitable between-copies distance.

3. The image forming apparatus according to claim 1, wherein
    the post-process execution portion applies the post-process to a sheet bundle loaded in a process tray,
    the option control portion accepts, from the main body control portion, a last sheet notification, which indicates that the last sheet of sheets targeted for the post-process is introduced, to recognize that the last sheet is introduced, and if the post-process for the sheet bundle, which is loaded in the process tray and includes the last sheet, is ended, the option control portion delivers the sheet bundle that includes the last sheet,
    the control information stored in the option storage portion includes data that indicates a suitable number of sheets which is a maximum number of sheets capable of being loaded in the process tray,
    in a case where the option control portion does not accept the last sheet notification from the main body control portion before a number of sheets loaded in the process tray reaches the suitable number, the option control portion determines that the unsuitableness error occurs, and transmits the control information, which includes the data stored in the option storage portion and indicating the suitable number, and the error information to the main body control portion, and
    the main body control portion updates the control information stored in the main body storage portion based on the control information transmitted from the option control portion, and thereby thereafter does not accept an execution instruction of the post-process which loads a number of sheets exceeding the suitable number into the process tray.

4. The image forming apparatus according to claim 1, wherein:
    in the case where the main body control portion updates the control information stored in the main body storage portion based on the control information transmitted from the option control portion, the main body control portion makes the main body storage portion store an update history of the control information.

5. The image forming apparatus according to claim 4, comprising:
a display portion that displays the update history of the control information.

6. An image forming apparatus comprising:
an option device that includes an option control portion and an option storage portion;
a printing portion that prints an image onto a sheet;
a main body storage portion that stores control information which defines a control condition of the option device;
an I/F portion for communicating with the option device mounted on the image forming apparatus; and
a main body control portion that makes the printing portion perform operation in accordance with the control condition of the option device and gives, via the I/F portion, an operation instruction to the option control portion based on the control condition of the option device, wherein
the option storage portion stores control information that defines a control condition suitable for specifications of the option device,
in a case where an unsuitableness error, which is an error caused by the control information stored in the main body storage portion being unsuitable for the specifications of the option device, occurs in the option device, the option control portion transmits, via the I/F portion, error information indicating content of the occurring unsuitableness error and the control information stored in the option storage portion to the main body control portion,
the main body control portion updates the control information stored in the main body storage portion based on the control information transmitted from the option control portion such that the control information stored in the main body storage portion becomes suitable for the specifications of the option device,
the option device is a post-process device including a post-process execution portion that applies a post-process to the sheet introduced from the printing portion,
in a case where a mode of the post-process executed between a preceding job and a following job is switched, after the post-process of the preceding job is ended, the option control portion accepts, from the main body control portion, an instruction for starting a preparation process for the post-process to be performed in the following job to start the preparation process, and after the preparation process is completed, the option control portion makes the post-process execution portion perform the post-process to be performed in the following job,
the control information stored in the option storage portion includes data that indicates a suitable instruction timing which is a timing to output the instruction for starting the preparation process,
in the case where the mode of the post-process executed between the preceding job and the following job is switched, after the post-process of the preceding job is ended, if the sheet arrives at a process position of the post-process to be performed in the following job in a state where the instruction for starting the preparation process is not accepted, the option control portion determines that the unsuitableness error occurs, and transmits the control information, which includes the data stored in the option storage portion and indicating the suitable instruction timing, and the error information to the main body control portion, and the main body control portion updates the control information stored in the main body storage portion based on the control information transmitted from the option control portion, thereby thereafter transmitting the instruction for starting the preparation process to the option control portion at the suitable instruction timing in the case where the mode of the post-process executed between the preceding job and the following job is switched.

7. The image forming apparatus according to claim 6, wherein:
the post-process execution portion applies the post-process to a sheet bundle loaded in a process tray,
the option control portion accepts, from the main body control portion, a last sheet notification, which indicates that the last sheet of sheets targeted for the post-process is introduced, to recognize that the last sheet is introduced, and if the post-process for the sheet bundle, which is loaded in the process tray and includes the last sheet, is ended, the option control portion delivers the sheet bundle that includes the last sheet,
the control information stored in the option storage portion includes data that indicates a suitable number of sheets which is a maximum number of sheets capable of being loaded in the process tray,
in a case where the option control portion does not accept the last sheet notification from the main body control portion before a number of sheets loaded in the process tray reaches the suitable number, the option control portion determines that the unsuitableness error occurs, and transmits the control information, which includes the data stored in the option storage portion and indicating the suitable number, and the error information to the main body control portion, and
the main body control portion updates the control information stored in the main body storage portion based on the control information transmitted from the option control portion, and thereby thereafter does not accept an execution instruction of the post-process which loads a number of sheets exceeding the suitable number into the process tray.

8. The image forming apparatus according to claim 6, wherein:
in the case where the main body control portion updates the control information stored in the main body storage portion based on the control information transmitted from the option control portion, the main body control portion makes the main body storage portion store an update history of the control information.

9. An image forming apparatus comprising:
an option device that includes an option control portion and an option storage portion;
a printing portion that prints an image onto a sheet;
a main body storage portion that stores control information which defines a control condition of the option device;
an I/F portion for communicating with the option device mounted on the image forming apparatus; and
a main body control portion that makes the printing portion perform operation in accordance with the control condition of the option device and gives, via the I/F portion, an operation instruction to the option control portion based on the control condition of the option device, wherein the option storage portion stores control information that defines a control condition suitable for specifications of the option device, in a case where an unsuitableness error, which is an error caused by the control information stored in the main body storage portion being unsuitable for the specifications of the option device, occurs in the option device, the option control portion transmits, via the I/F portion, error information indicating content of the occurring unsuitableness error and the control information stored in the option storage portion to the main body control portion, the main body control portion updates the control information stored in the main body storage portion based on the control information transmitted from the option control portion such that the control information stored in the main body storage portion becomes suitable for the specifications of the option device, the option device is a post-process device including a post-process execution portion that applies a post-process to the sheet introduced from the printing portion, in a case where a sheet size in a preceding job and a sheet size in a following job are different from each other, after the post-process of the preceding job is ended, the option control portion accepts, from the main body control portion, an instruction for starting a preparation process for the post-process to be performed in the following job to start the preparation process, and after the preparation process is completed, the option control portion makes the post-process execution portion perform the post-process to be performed in the following job, the control information stored in the option storage portion includes data that indicates a suitable instruction timing which is a timing to output the instruction for starting the preparation process, in the case where the sheet size in the preceding job and the sheet size in the following job are different from each other, after the post-process of the preceding job is ended, if the sheet arrives at a process position of the post-process to be performed in the following job in a state where the instruction for starting the preparation process is not accepted, the option control portion determines that the unsuitableness error occurs, and transmits the control information, which includes the data stored in the option storage portion and indicating the suitable instruction timing, and the error information to the main body control portion, and the main body control portion updates the control information stored in the main body storage portion based on the control information transmitted from the option control portion, thereby thereafter transmitting the instruction for starting the preparation process to the option control portion at the suitable instruction timing in the case where a sheet size in the preceding job and a sheet size in the following job are different from each other.

10. The image forming apparatus according to claim 9, wherein:

the post-process execution portion applies the post-process to a sheet bundle loaded in a process tray, the option control portion accepts, from the main body control portion, a last sheet notification, which indicates that the last sheet of sheets targeted for the post-process is introduced, to recognize that the last sheet is introduced, and if the post-process for the sheet bundle, which is loaded in the process tray and includes the last sheet, is ended, the option control portion delivers the sheet bundle that includes the last sheet, the control information stored in the option storage portion includes data that indicates a suitable number of sheets which is a maximum number of sheets capable of being loaded in the process tray, in a case where the option control portion does not accept the last sheet notification from the main body control portion before a number of sheets loaded in the process tray reaches the suitable number, the option control portion determines that the unsuitableness error occurs, and transmits the control information, which includes the data stored in the option storage portion and indicating the suitable number, and the error information to the main body control portion, and the main body control portion updates the control information stored in the main body storage portion based on the control information transmitted from the option control portion, and thereby thereafter does not accept an execution instruction of the post-process which loads a number of sheets exceeding the suitable number into the process tray.

11. The image forming apparatus according to claim 9, wherein:

in the case where the main body control portion updates the control information stored in the main body storage portion based on the control information transmitted from the option control portion, the main body control portion makes the main body storage portion store an update history of the control information.

* * * * *